United States Patent [19]

Dowd

[11] 4,216,187

[45] Aug. 5, 1980

[54] METHOD OF DETOXIFYING ORGANOTIN-CONTAINING PAINT RESIDUES

[75] Inventor: Theodore Dowd, Arlington, Va.

[73] Assignee: The United States of America as represented by the Secretary of Transportation, Washington, D.C.

[21] Appl. No.: 48,328

[22] Filed: Jun. 14, 1979

[51] Int. Cl.$^2$ ............................................. C01G 19/00
[52] U.S. Cl. ........................................ 423/98; 423/90
[58] Field of Search ................ 423/89, 90, 98; 75/98, 75/101 R, 121

[56] References Cited

U.S. PATENT DOCUMENTS

| 200,587 | 2/1878 | Vogellus | 423/90 |
| 2,011,305 | 8/1935 | Smith | 423/90 |
| 3,845,190 | 10/1974 | Yosim et al. | 423/659 A |

Primary Examiner—Wayne A. Langel
Attorney, Agent, or Firm—Harold P. Deeley, Jr.; Otto M. Wildensteiner; Herbert E. Farmer

[57] ABSTRACT

A method of detoxifying organotin-containing paint residues that are sandblasted from the bottom of a ship's hull comprising cleaving the tincarbon bond by application of an oxidizing agent, preferably nitric acid.

1 Claim, No Drawings

METHOD OF DETOXIFYING ORGANOTIN-CONTAINING PAINT RESIDUES

STATEMENT OF GOVERNMENT INTEREST

The present invention was conceived by an employee of the United States Government and may be used by or for the government without the payment of any royalties thereon or therefor.

BACKGROUND

The underwater portion of a ship's hull must be painted with a paint which contains a substance that is toxic to marine organisms in order to prevent the growth of those organisms on the hull. The toxicant which is presently being introduced into the newer paint formulations is organotin, which is usually in the form of tributyltin or tripropyltin. These organotin toxicants are very efffective in their intended role, but they are highly toxic to man.

Even after the effectiveness of a paint which contains an organotin toxicant has been reduced to a very low level as an antifoulant (due to leaching out of the organotin toxicant), it is still very toxic to man. When the old paint is removed from a ship's hull, usually by sandblasting, the paint residue contains enough organotin to present a serious hazard. The paint residue must be disposed of like any other toxic industrial waste, which at present is by packaging it in steel drums and burying the drums in an approved disposal site.

Disposal in this way does not eliminate the hazard, however; if the drums leak and ground water gets into the paint residues, the toxicant can be leached out and it then contaminates the groundwater in that area. Thus burying the paint residues merely delays the onset of problems due to organotin contamination rather than curing the problem. It has been suggested that the organotin can be detoxified by roasting it in a furnace; this consumes energy, hence is wasteful. What is needed is a method of detoxifying the organotin toxicant that does not use energy or cause pollution problems of its own.

OBJECTS OF THE INVENTION

Accordingly, it is an object of the present invention to provide a method of detoxifying organotin toxicants.

It is a further object to provide such a method which does not use any additional energy to detoxify the organotin.

It is a further object to provide a method which can be practiced without the use of specialized equipment.

SUMMARY

Briefly, the present invention comprises treating the organotin-containing paint residue with an oxidizing agent, preferably nitric acid. This breaks the tin-carbon bond, leaving the tin in its inorganic, hence harmless, state.

BRIEF DESCRIPTION OF THE PREFERRED EMBODIMENT

The paint residues used in the development of the present invention were the product of sandblasting a spent coat of anti-fouling paint from the bottom of a Coast Guard vessel. The paint, known commercially as "Porter 305 AF", is a coal tar-epoxy paint which contains tributyltin acetate (TBTA) dispersed in it, manufactured by Porter Paint Co., Louisville, Kentucky 40201.

Although the paint residues did not contain enough TBTA to be effective as an antifoulant, they did contain enough to be toxic to man. Studies showed that there was enough TBTA to be leached out in toxic amounts by water that was passed through the residues at a rate that simulated a naturally-occurring leach rate.

Three oxidizers were tested for use in the method: hydrogen peroxide, potassium permanganate, and nitric acid. For the initial studies, samples of pure TBTA were prepared by mixing bis(tri-n-butyltin)oxide with an aqueous solution of acetic acid. This produced solid TBTA which was then mixed with the above oxidizing agents in the initial studies.

For the hydrogen peroxide test, 1.0 gram of TBTA and 30 ml of 30% hydrogen peroxide were placed in a flask with a magnetic stirring bar. The mixture was stirred at room temperature for three hours and then filtered. The filtrate was extracted with three 10 ml portions of dichloromethane to remove unreacted TBTA. It was then analyzed by atomic absorption spectroscopy, which indicated a very low level of tin. Therefore it was concluded that the hydrogen peroxide did not react to any appreciable extent with the TBTA.

For the potassim permanganate test, 1.0 gram of TBTA and 25 ml of 1.0 M potassium permanganate solution were placed in a flask with a magnetic stirring bar. The mixture was stirred at room temperature for three hours, during which time some brown manganese dioxide was formed. Filtration of the reaction mixture was extremely difficult due to the pasty nature of the solids. A small portion of the filtrate was analyzed by atomic absorption spectroscopy, and showed the presence of inorganic tin, but a quantitative measurement of conversion was not made.

For the nitric acid test, 1.0 gram of TBTA and 25 ml of 20% nitric acid solution were placed in a flask with a magnetic stirring bar. The mixture was stirred at room temperature for two hours, during which time some of the TBTA appeared to go into solution. The mixture was filtered, yielding 0.68 gram of TBTA. The filtrate was treated with a 10% solution of sodium hydroxide until neutral to litmus paper and then extracted with dichloromethane to remove any TBTA in solution. Atomic absorption spectroscopy analysis indicated at 15% conversion of TBTA to inorganic tin.

The above experiment was repeated with a reflux condenser on the flask and the mixture heated to 100 degrees C. All of the TBTA went into solution. The mixture was cooled, neutralized with 10% sodium hydroxide, and extracted with dichloromethane. Evaporation of the dichloromethane yielded no organic residue, and atomic absorption spectroscopy analysis of the aqueous phase showed an essentially complete conversion of the TBTA to inorganic tin.

One hundred grams of sand-paint mixture was treated as above and used in a toxicology study. In this study four 20 gallon marine fish tanks were set up according to standard procedures for aquaria. Each was equipped with aeration, undergravel filter, and thermostatic temperature control. The following were placed in each tank: 4 flounders, 2 rockfish, and 11 prawns; they were chosen because of availability, hardiness, and widespread habitation. The tanks were then allowed to stand for three weeks in order for the marine creatures to adapt to the tanks. During this time water samples from each tank were analyzed for tin content. All samples showed a high tin content, which was determined to have come from the gravel used in the tanks; since none of the creatures died, it was assumed to have been totally inorganic tin.

Tank I was left untouched as a control. Into tank II was placed 100 grams of the untreated sand-paint residue mixture; into tank III was placed 1.0 gram of TBTA, and into tank IV was placed 100 grams of sand-paint residue mixture that had been treated with nitric acid in the reflux flask as above and then neutralized with sodium hydroxide. Tanks II and III showed partial mortality within eight hours, and within 24 hours all creatures were dead. None of the creatures in tank I, the control tank, died during the three week test period. Tank IV showed no mortality until the third week, when one flounder died. It was decided that this creature died of natural causes, since no other deaths occurred during the remainder of the three weeks. The study was terminated after the end of the third week.

The next test was to determine the effectiveness of detoxifying paint wastes in a manner that simulates the way in which the wastes would be detoxified in the field. Samples of 80±0.5 grams of sandblast waste (i.e., paint residue and sand) were placed in 100 ml beakers and then 40±0.5 ml of nitric acid of various concentrations were added and the beakers were covered with watch glasses. Every sample was covered with at least one half inch of nitric acid. The nitric acid had strengths of 10, 20, 30, etc. percent by volume up to 100 percent; the samples were kept at 5±3 degrees C., ambient (20±3 degrees C.), and 35±0.5 degrees C. Half of the samples treated with 20% and 50% nitric acid were stirred once or twice daily to determine the effect of agitation; the rest were left undisturbed. Nitric acid which evaporated from the high temperature samples was replaced in such a way as to minimize agitation of the test samples.

Samples of nitric acid were withdrawn from each beaker and analyzed for total tin content by atomic absorption spectrophotometer at regular intervals. Conversion of organotin to inorganic tin was determined by extraction by dichloromethane as in the earlier tests.

The tests showed that 20% nitric acid is satisfactory for detoxifying the paint residues, at ambient temperature; at lower temperatures the reaction would take a longer time to complete. Extraction by dichloromethane showed no organotin in the acid after 24, 48, and 72 hours. As a check, TBTA was added to the test samples immediately before extraction; most of the added TBTA was detected. When the test samples were allowed to stand for 24 hours after having had TBTA added to a concentration of 0.08% in the acid solution, no organotin was detected in the acid solution. The residue used in the 20% and 40% studies at ambient and 35 degrees C. was allowed to stay in the beakers for 144 hours, then washed with distilled water and treated with concentrated nitric acid at 35 degrees C. for 48 hours. Tests showed no tin remaining in the residue, within the limits of experimental error.

The tests on the samples that had been stirred showed the same results as on the samples that had been carefully left undisturbed; thus stirring or other agitation is not needed to detoxify the residue.

Conversion of the organotin to inorganic tin was complete in three days at 35 degrees and one week at ambient (approximately 20 degrees C.) in 20% acid. At 5 degrees C. a higher concentration (40%) is needed to complete the conversion in a week, or a dwell time in excess of one week at 20% concentration.

Although the present method has been shown only on paint wherein the organotin has been physically added to the paint rather than being chemically incorporated into it, the method will also work on paints where the organotin is chemically linked to the paint.

The preferred oxidizer for use in the present method is nitric acid; it is the best oxidizing acid, it does not leave a solid residue, and any excess acid is degraded by ultraviolet rays. Any other oxidizer can be used, however, if it has the necessary strength.

Although the present method has been described for use on paint residues, it obviously can be used to detoxify any substance which contains an organotin toxicant. If the organotin-containing substance is a solid, it can if necessary be mechanically pulverized in order to increase the surface area that is exposed to the nitric acid.

What is claimed is:

1. The method of detoxifying substances which contain tributyltin acetate, which comprises: treating said substance with nitric acid to break the tin-carbon bond in said tributyltin acetate.

* * * * *